United States Patent
Alibert et al.

(10) Patent No.: US 6,428,944 B1
(45) Date of Patent: Aug. 6, 2002

(54) FABRICATION OF GRATINGS IN PLANAR WAVEGUIDE DEVICES

(75) Inventors: Guilhem J. Alibert, Savigny sur Orge; Nikolaus Boos, Fontainebleau; Mark D. Salik, Paris, all of (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/942,187

(22) Filed: Aug. 29, 2001

(30) Foreign Application Priority Data

Sep. 6, 2000 (EP) .............................................. 00402451

(51) Int. Cl.[7] .............................. G02B 6/136; G02B 6/10
(52) U.S. Cl. ........................................ 430/321; 430/290
(58) Field of Search ........................... 430/321, 22, 290; 385/129

(56) References Cited

U.S. PATENT DOCUMENTS

| | | | |
|---|---|---|---|
| 5,178,978 A | * 1/1993 | Zanoni et al. | 430/11 |
| 5,371,817 A | 12/1994 | Revelli, Jr. et al. | 385/44 |
| 5,471,552 A | 11/1995 | Wuu et al. | 385/49 |
| 5,550,088 A | 8/1996 | Dautartas et al. | 437/225 |
| 5,915,051 A | 6/1999 | Damask et al. | 385/16 |

FOREIGN PATENT DOCUMENTS

| | | | |
|---|---|---|---|
| JP | 6-027338 A | * 2/1994 | |
| WO | WO 00/43817 | 7/2000 | |

* cited by examiner

*Primary Examiner*—John A. McPherson
(74) *Attorney, Agent, or Firm*—Juliana Agon

(57) ABSTRACT

A method of fabricating a grating in a planar optical device by fabricating a surface grating or by photoinscription. For surface gratings, a method comprises providing a substrate material that includes a substrate layer, a first core layer, a second core layer, and a first photoresist layer. An exposure of a grating and a plurality of alignment marks is formed onto the substrate material. The second core layer is etched to form the grating in the second core layer. A second photoresist layer is deposited on the substrate material that remains after the first etching. An exposure of a waveguide pattern is formed in the first core layer. The first core layer is etched to define a first waveguide in the first core layer, where the first waveguide includes a first portion having the surface grating. For photoinscription, the fabrication method comprises providing a substrate material that includes a substrate layer, a core layer, and a first photoresist layer. A first photo-mask that includes a plurality of alignment marks is disposed between the first photoresist and a light source. An exposure of the first photo-mask is performed and the alignment marks are etched into the core layer. A grating is written into the core layer by a photosensitive effect. A second photoresist layer is deposited on the substrate material and an exposure of a waveguide pattern is formed in the core layer. The core layer is etched to define a first waveguide in the core layer, where the first waveguide includes a first portion having the surface grating.

16 Claims, 4 Drawing Sheets

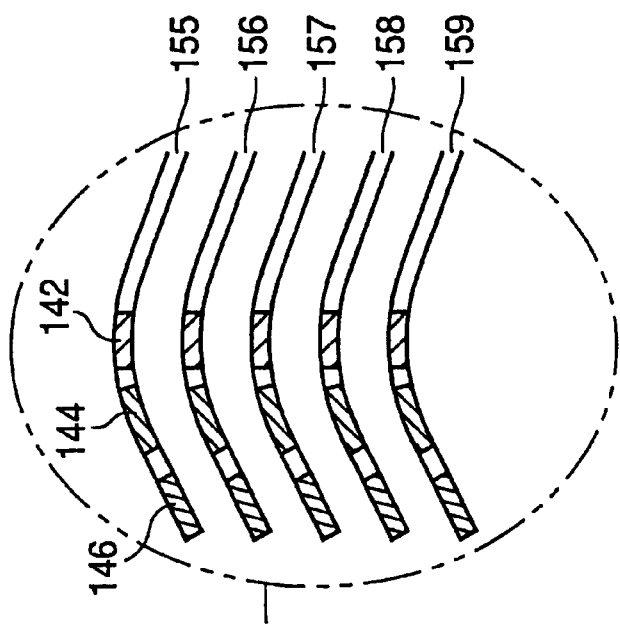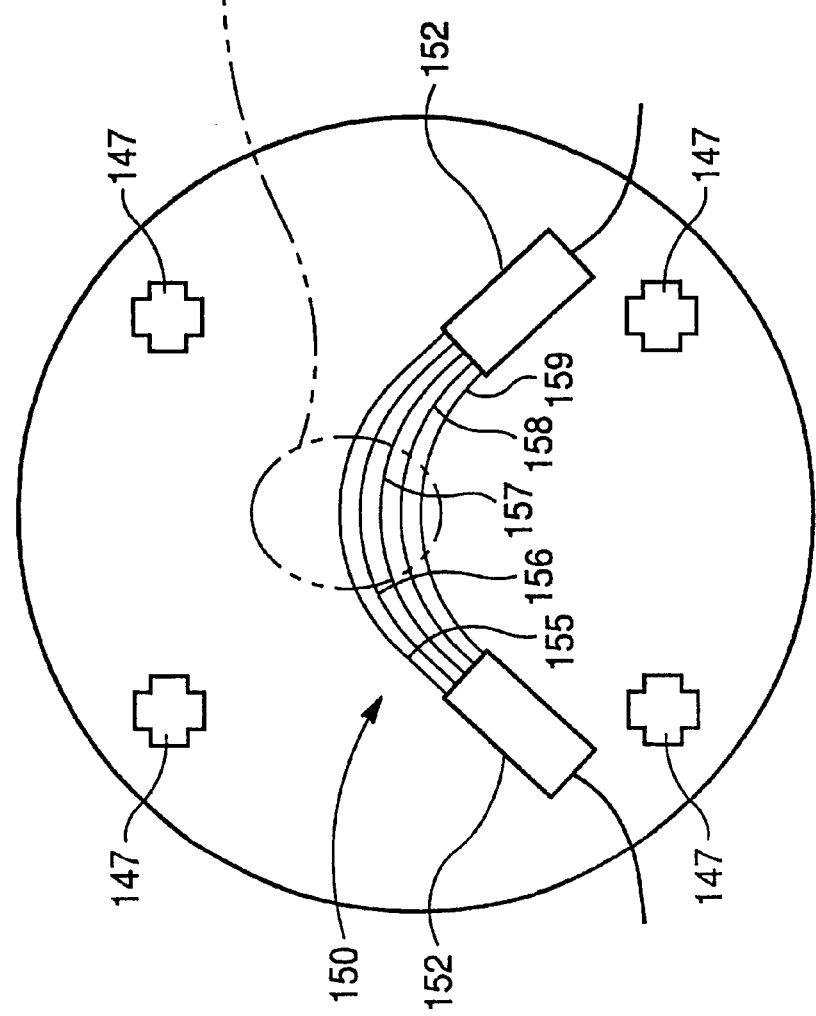

FABRICATION OF GRATINGS IN PLANAR WAVEGUIDE DEVICES

CROSS REFERENCE TO RELATED APPLICATION

This application claims the benefit of European Application No. 00402451.9, filed Sep. 6, 2000.

BACKGROUND OF THE INVENTION

1. Field of the Invention

The present invention is directed to a method of fabricating an optical grating or multiple gratings in a planar waveguide device.

2. Description of the Related Art

Periodic grating elements have numerous applications in planar optical waveguides: for example, as Bragg reflectors they can be used for spectral filtering, add/drop multiplexing or dispersion compensation elements. They also have applications as beam deflectors, waveguide lenses, mode converters and input/output couplers.

In particular, Bragg reflectors can be used in a zero-order phasar component. For example, in the commonly owned and co-pending PCT application no. WO 99/36817, a monolithic planar waveguide device is described. In this device, multiple grating elements are placed over the parallel paths of a phasar region (also referred to as an arrayed waveguide grating ("AWG") region) in which each grating respectively reflects one specific wavelength and therefore the device can act as a drop-multiplexer.

For example, FIG. 1 represents a schematic layout of a device described in WO 99/36817. Optical device 10 includes an M×N evanescent coupler 30 and N×O coupler 70, e.g., free space N×N couplers having a planar arrangement of two linear waveguide arrays separated by a free space region. M×N evanescent coupler 30 has M exterior ports 20 and N interior ports 40. Exterior ports 20 are used to access the exterior of the device 10. Interior ports 40 are individually connected to N optical paths 110 to 11N. The optical paths 110 to 11N are connected at the other end to the N interior ports 60 of N×O evanescent coupler 70. N×O coupler 70 also includes exterior ports 80, which access the exterior of device 10. Wavelength selecting elements 50 to 5M-1 are disposed on the N optical paths 110 to 11N. Wavelength selecting element 52, e.g., a Bragg reflector, is tuned to $\lambda_1$, element 52 is tuned to $\lambda_2$, and element 5M-1 is tuned to the M-1$^{th}$ wavelength supported by device 10. Thus, light having wavelengths $\lambda_{M-1}$ enters exterior port 20M and is equally divided.

In such a device, if Bragg reflectors are used as wavelength selecting elements, sub-micron positioning precision of the Bragg reflectors (50, 52, et seq.) within the phase array is needed in order to achieve the desired optical functionality of the device.

In addition to the required positioning precision, it is also desirable to utilize a Bragg reflector having a high reflectivity. For example, consider that Bragg reflectors utilized in a device such as optical device 10 are required to reflect 99.9% of the incident light power at the design wavelength to ensure a maximum crosstalk of −30 dB. From the coupled-wave theory of Bragg reflectors the reflectivity is given by:

$$|r(\omega)|^2 = |\tanh(\kappa L)|^2$$

The reflectivity specification of 99.9% implies that $$\kappa L > 4.15$$

where $\kappa$ is the grating contra-directional mode coupling coefficient and L is the grating length. Thus, in order to achieve a $\kappa \cdot L$ value of 4.15, either the grating length needs to be large, or the mode coupling coefficient needs to be large.

SUMMARY OF THE INVENTION

Thus, what is needed is a straightforward method of fabricating a grating in a planar waveguide device in a high precision manner. Also, what is needed is a straightforward method of fabricating a grating in a planar waveguide device to increase the coupling coefficient $\kappa$ thereby allowing for a reduced grating length. In view of the foregoing, according to an embodiment of the present invention, a method of fabricating a grating in a planar waveguide device comprises providing a substrate material that includes a substrate layer, a first core layer, a second core layer, and a first photoresist layer. An exposure of a grating and a plurality of alignment marks is formed onto the substrate material. The second core layer is etched to form the grating in the second core layer. A second photoresist layer is deposited on the substrate material that remains after the first etching. An exposure of a waveguide pattern is formed in the first core layer. The first core layer is etched to define a first waveguide in the first core layer, where the first waveguide includes a first portion having the surface grating.

According to another embodiment of the present invention, a method of fabricating a grating in a planar waveguide device comprises providing a substrate material that includes a substrate layer, a core layer, and a first photoresist layer. A first photo-mask that includes a plurality of alignment marks is disposed between the first photoresist and a light source. An exposure of the first photo-mask is performed and the alignment marks are etched into the core layer. A grating is written into the core layer by a photosensitive effect. A second photoresist layer is deposited on the substrate material and an exposure of a waveguide pattern is formed in the core layer. The core layer is etched to define a first waveguide in the core layer, where the first waveguide includes a first portion having the surface grating.

Further features of the invention form the subject matter of the claims and will be explained in more detail, in conjunction with further advantages of the invention, with reference to exemplary embodiments.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. The drawings, however, do not limit the scope or practice of the invention.

FIGS. 3A–3B show an example monolithic planar waveguide device fabricated according to the method of one embodiment of the present invention.

DETAILED DESCRIPTION OF THE PREFERRED EMBODIMENTS

The present invention is directed to a method of fabricating a grating in a planar optical waveguide.

In a first embodiment, a method of fabricating a grating or multiple gratings in a planar waveguide device is provided. First, a substrate material having first and second core layers is prepared. Next, a grating exposure technique is utilized to generate an exposure of the grating(s) onto the second core layer. After a first etching is utilized to leave only the grating(s), a second exposure and etching is utilized to define one or more waveguide channels in the first core layer. The material is then covered with an overcladding to complete the formation of the planar waveguide device. In this embodiment, the grating is a surface-relief element formed at the waveguide-cover interface. Preferably, the grating is a Bragg reflector grating.

Figure 2A:
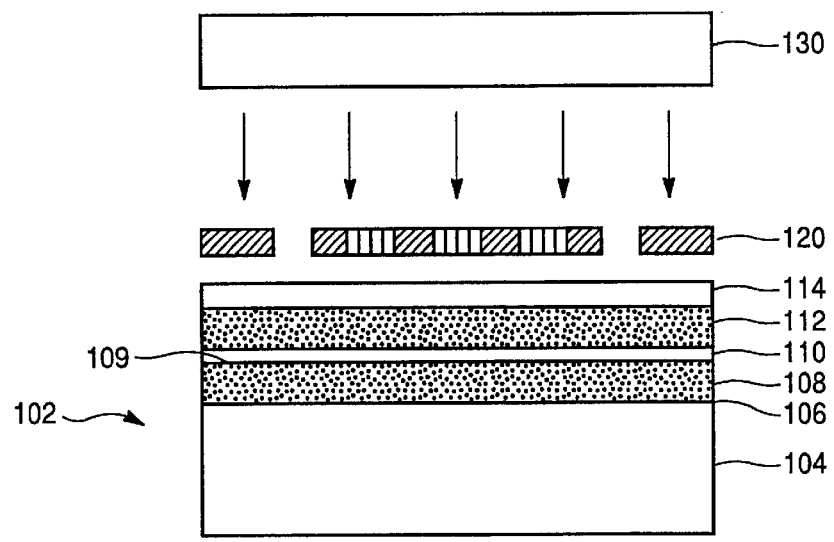
FIGS. 2A–2B show a schematic illustration of method of fabricating a grating in a planar waveguide device according to one embodiment of the present invention.
Figure 2B:
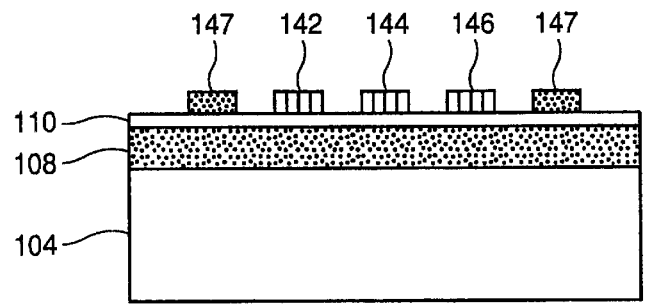

A preferred aspect of the first embodiment of the present invention is hereby described with reference to FIGS. 2A–2C. First, a substrate material is prepared, such as substrate material 102 shown in FIG. 2A. The substrate material includes a substrate 104, a first core layer 108, a second core layer 112, and photoresist layer 114. In this preferred embodiment the substrate material 102 further includes a buffer layer 106 and a thin cladding layer 110, but those layers can be omitted.

Substrate layer 104 can be any conventional substrate used in waveguide applications. In one aspect of this embodiment of the present invention, the substrate can be a silicon-based material, such as Si, $SiO_2$, doped-$SiO_2$, SiON, and the like, or TaO. Other conventional substrates will become apparent to those of ordinary skill in the art given the present description. The substrate can be of various geometrical shapes, such as rectangular or circular. Preferably, the substrate layer 104 is a $SiO_2$ substrate of circular shape, having a 100 millimeter (mm) diameter, and a thickness of between 0.5–2 mm.

In addition, for some materials such as silicon, the substrate can also include a buffer layer 106 located at or near the interface with the first core layer 108. Preferably, the buffer layer 106 is of sufficient index of refraction to create an index differential of between about 0.3% to about 1.0%, with respect to the index of refraction of the first core layer. For example, a preferred index differential is about 0.7%.

Substrate material 102 further includes a first core layer 108, which can be selected from materials such as, but without limitation, doped-silica based materials and other conventional materials used for waveguides. For example, in a preferred embodiment, layer 108 is a doped-$SiO_2$ layer, having an index of refraction of about 1.46, and a thickness of about 1–10 micrometers ($\mu$m). In a preferred embodiment, core layer 108 has a slightly higher index of refraction than substrate layer 104 (or buffer layer 106, if utilized). Core layer 108 can be deposited on substrate 104 by conventional deposition techniques, such as sputtering, flame hydrolysis deposition (FHD), chemical vapor deposition (CVD), and plasma-enhanced chemical vapor deposition (PECVD).

Optionally, substrate material 102 can further include a thin cladding material 110, having a thickness of from about less than 0.1 $\mu$m to about 10 $\mu$m. Preferably, layer 110 comprises a thin layer of undoped-$SiO_2$, having a thickness of about 1 $\mu$m. Layer 110 can be used to act as an etch stop layer in the subsequent etching process (protecting first core layer 108 from unwanted etching) to allow for a well-controlled grating depth. Cladding layer 110 can be deposited on first core layer 108 by conventional deposition techniques. In a preferred aspect of this embodiment of the present invention, layer 108 has a higher index of refraction than layer 110. Alternatively, layer 110 can be omitted from substrate material 102.

Substrate material 102 further includes a second core layer 112 that can be the same material as first core layer 108 or a different material. For example, in a preferred embodiment, second core layer 112 is a doped-$SiO_2$ layer having an index of refraction of about 1.46, and a thickness of about 0.1–2 micrometers ($\mu$m). In a preferred aspect of this embodiment, layer 112 has the same index of refraction as layer 108. Alternatively, in another preferred aspect of this embodiment of the present invention, second core layer 112 is of sufficient index of refraction to create an index differential of at or between about 0.3% to about 1.0% with respect to the index of refraction of the first core layer 108. For example, a preferred index differential is about 0.7%. Second core layer 112 can be deposited on first core layer 108 by conventional deposition techniques.

In an alternative aspect of this embodiment of the present invention, second core layer 112 can be a material having a slightly higher index of refraction than first core layer 108. For example, second core layer 112 can be a silica-based material, having an index of refraction of about 1.47 in order to create an index differential with respect to first core layer 108 of about 0.6%. In an example calculation, a second core layer having an index of 1.47 can increase $\kappa$ without a thin cladding layer, and therefore permit shorter gratings. The index can be increased further, especially if the cladding layer is present, as this "weakens" the effect of the grating.

Substrate material 102 further includes a photoresist layer 114, which can comprise a conventional polymer or photoresist material. Preferably, photoresist layer 114 comprises a thin layer of conventional photoresist for initial pattern definition by conventional photolithographic techniques.

According to the process of the first embodiment of the present invention, an initial pattern of a grating or gratings is defined on the photoresist layer 114 of the substrate material 102. In a preferred embodiment, multiple gratings are exposed on the substrate material. The grating exposure is performed either holographically or with a photo-mask.

Figure 2C:
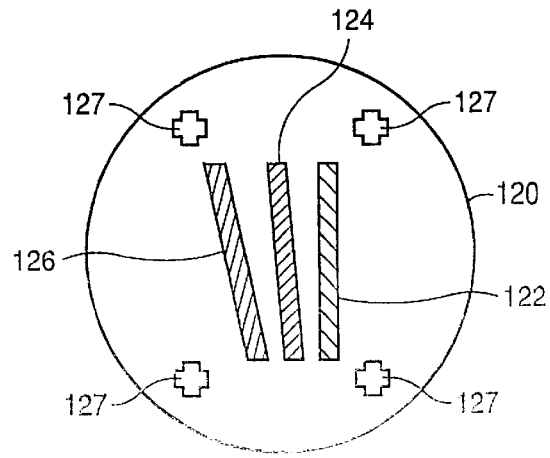
FIG. 2C shows a phase mask utilized in exposing a grating on a waveguide device according to another embodiment of the present invention.

In a preferred aspect of this embodiment of the present invention, and with reference to FIG. 2C, a photo-mask 120, such as a phase mask, containing one or more grating patterns 122, 124, and 126, is exposed onto the substrate material using a conventional light source 130, such as an ultraviolet laser. In addition, two or more precise alignment marks 127 are included on the photo-mask 120 for the alignment of the gratings in the optical waveguide device. In particular, the alignment marks 127 help ensure highly accurate alignment of the gratings with respect to the waveguides formed in subsequent fabrication process steps.

For example, the substrate material can be disposed directly behind the photo-mask with respect to the light source so that the light transmitted through the photo-mask creates an interfering beam pattern on the thin photoresist layer, which corresponds to the desired grating pattern.

As is depicted in FIG. 2C, grating patterns 122, 124, and 126 are Bragg reflector grating patterns and can vary in angular orientation with respect to one another. For example, the angular variation can depend on the type of planar waveguide device being fabricated. If a device, such as device 10 from FIG. 1 containing multiple gratings is being fabricated, precise positioning of the grating pattern arrangement, with respect to the geometrical shape of the gratings, the spacing between the gratings on the photo-mask, and the orientation of the individual waveguides, is important. With this type of photo-mask and grating pattern arrangement, multiple grating patterns can be initially defined in a substrate material in a single photolithographic process. The grating pattern arrangement shown in FIG. 2C can be formed on a conventional photo-mask using a high precision nano-fabrication technique, such as electron beam writing, or by an interfering beam technique, as would be apparent to one of ordinary skill in the photolithographic arts given the present description. In addition, the design of the photo-mask may also depend on the type of light source being utilized and its output wavelength.

Alternatively, a photo-mask having a single grating pattern of a variable pitch can be utilized to initially define a multiple grating pattern in the photoresist layer of the substrate material. For example, a single, relatively long grating pattern can be written onto a photo-mask, where the pitch of the single grating pattern varies from one end of the grating pattern to the other in a linear manner. This alternative aspect would require additional photolithographic exposures, and multiple photo-mask positioning of the grating between the exposures to initially define each of the gratings in the substrate material.

After the initial definition of the grating pattern, the photoresist is developed. Next, the gratings and alignment marks are etched into the second core layer 112 by a conventional etching technique, such as reactive ion etching (RIE) or ion beam etching. The resulting structure is shown in FIG. 2B, where all that remains of the second core layer are surface gratings 142, 144, and 146, and alignment marks 147, that are formed on thin cladding layer 110. In a preferred embodiment, the surface gratings have a fill factor of about 0.3–0.7, and an aspect ratio of about 0.33–17, where the half period is about 200 nm and the grating depth is about 0.1 $\mu$m–2 $\mu$m.

The use of cladding layer 110 ensures a well-controlled grating depth, here the thickness of the second core layer 112. Alternatively, if cladding layer 110 is omitted from substrate material 102, then surface gratings 142, 144, and 146, and alignment marks 147, would be formed on a surface 109 of first core layer 108. Since cladding layer 110 may reduce the coupling coefficient, this alternative aspect can provide a higher coupling coefficient value.

In a further alternative aspect of this embodiment of the present invention, a holographic technique is used to create an exposure of a grating onto the substrate material 102. The exposure can be performed using an interfering beam apparatus which forms an exposure of a grating on the first photoresist layer 114. Suitable interfering beam techniques are known. Moreover, numerous different techniques can be utilized, such as using a division of amplitude or of the wavefront of the initial beam, as would be apparent to one of skill in the art given the present description. Given practical constraints, multiple exposures are utilized to create multiple gratings in the substrate material.

Next, the photoresist is developed and the gratings and alignment marks are etched into the second core layer 112 by a conventional etching technique, such as reactive ion etching (RIE) or ion beam etching, leaving surface gratings 142, 144, and 146, and alignment marks 147, formed on first core layer 108 or cladding layer 110, depending on the original structure of substrate material 102.

Next, a waveguide channel or multiple waveguide channels are defined in first core layer 108. In a preferred aspect of this embodiment of the present invention, the remaining substrate material is covered with a second photoresist layer (not shown) and a second exposure is performed. In the second exposure, a photo-mask containing a waveguide pattern (similar to the waveguide pattern shown in FIG. 3A) is exposed in the first core layer. The waveguide pattern contains a plurality of lines or stripes corresponding to a plurality of waveguide channels to be formed in the first core layer 108. In addition, the photo-mask contains a plurality of alignment marks to ensure alignment with respect to the surface gratings discussed above.

Next, a second etching is performed, this time of the first core layer 108 (and also cladding layer 110, if utilized), to define a waveguide or multiple waveguides in the first core layer. The etching can be performed by using a conventional etching technique, such as reactive ion etching (RIE) or ion beam etching. Thus, the remaining structure after the second etch is the waveguide channel or channels disposed on the substrate 104 and the surface gratings formed above, which are unaffected by the second etching. Here, the waveguide or waveguides formed have portions of their lengths containing the surface gratings 142, 144, and 146. In a preferred aspect, the surface gratings are each oriented with a predetermined angular position with respect to each waveguide channel.

After the waveguides are defined by the etching, an overcladding layer (not shown) is deposited on the remaining structure. The deposition can be performed using the conventional techniques discussed above. In a preferred aspect of this embodiment, the overcladding layer comprises the same material as the substrate layer 104. Other materials, such as polymer materials can also be used as the overcladding layer material. The overcladding layer helps to protect the waveguide device from environmental effects.

An example waveguide pattern formed by the above processes is shown in FIG. 3A. In this example, a planar waveguide device 150 includes five waveguide channels 155–159. The individual waveguide channels can have a width of about 2–8 $\mu$m. Planar waveguide device 150 can optionally include one or more regions 152 of solid core layer, which allow light to diverge within those regions. In addition, as shown in FIG. 3B, each of the waveguides 155–159 includes one or more wavelength selecting elements, here, surface gratings 142, 144, 146. Thus, planar waveguide device 150 can include an arrayed waveguide grating for demultiplexing applications.

The fabrication process of this embodiment of the present invention provides for the precision formation of surface gratings, such as Bragg reflectors, in a planar waveguide device. Each of the surface gratings can have a precisely controlled thickness. Thus, in a preferred aspect of this embodiment, a thin clad layer 110 is utilized because it allows complete etching of the grating layer ("second core layer") and therefore a well-controlled grating depth.

In addition, the above process allows for an increased mode coupling coefficient κ. As discussed above, for the etching of surface-relief gratings, the process addresses an important issue of fabrication reproducibility, namely the accurate control of the coupling coefficient, κ, using precise overgrown index layers. According to an aspect of this embodiment of the present invention, the use of high-index overlay layers further helps in fabricating a grating in a planar waveguide device with an increased coupling coefficient κ and a reduced grating length.

Figure 1:
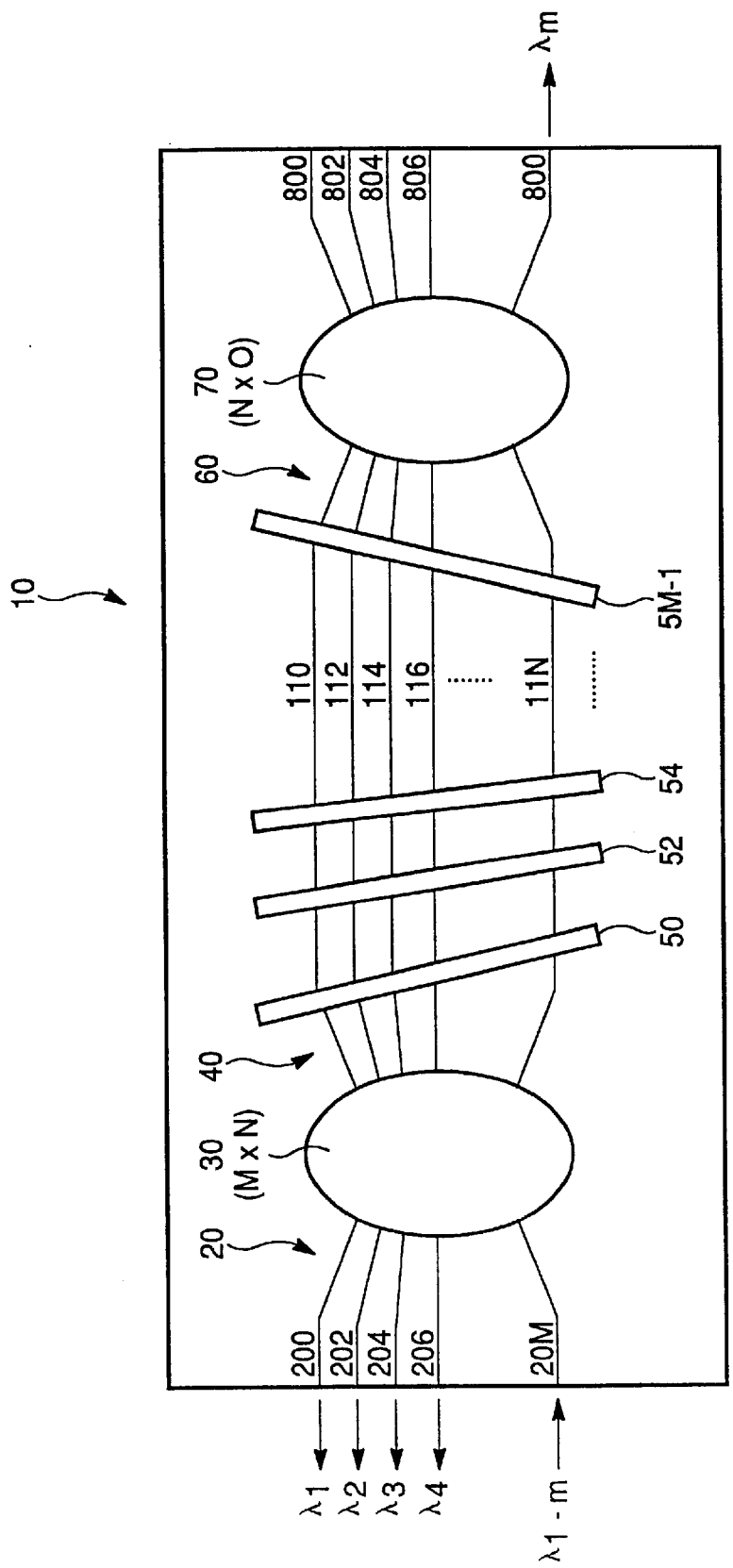
FIG. 1 shows a monolithic planar waveguide device.

For example, referring back to device 10 shown in FIG. 1 and the equations described in the Background of the Related Art, utilizing a wavelength of operation of $\lambda=1.55$ $\mu$m and slab waveguide parameters of $n_{guide}=1.46$, thickness=6 $\mu$m and $n_{clad}=n_{substrate}=1.45$, the value $\kappa$ can be calculated as a function of grating etch depth, aspect ratio and shape. For a surface grating etched directly into the waveguide core, for the reflection of the $TE_{00}$ mode, a rectangular surface grating of pitch $\Lambda=531.7$ nm, having an aspect ratio of 50% and an etch depth 200 nanometers (rn) can be modeled. The coupling coefficient calculated for this example is $\kappa=1.24$ cm$^{-1}$, which requires that the grating length L>33 mm in order to satisfy the crosstalk specification (−30 dB). For a device length of 100 mm, this grating length would permit a maximum of 3 gratings to be used in the device while satisfying the crosstalk specifications. However, according to the present invention, by fabricating the surface gratings directly on the surface of the first core layer, a further increase in $\kappa$ is achievable, leading to further gratings in the optical device. For example, a two-times increase in $\kappa$ can lead to two-times the number of gratings.

In addition, for a monolithic planar waveguide device having multiple Bragg gratings, in particular, the precision fabrication of Bragg gratings is important because the angle at which the Bragg gratings are arranged with respect to the longitudinal axis of the planar waveguide affects the relative delay of the light from each guide. By varying the angle of each grating, a phased array is created that steers the reflected wavelength of light towards different desired exterior ports. The position of each guide relative to the other waveguides at the free space interface causes light to be focused toward the ports on the other side of the free space interface. Each wavelength can be finely adjusted to a particular port, by the additional delay affected by the Bragg reflector. The relationship between the phase delay and the steering angle can be described by the following equation:

$$\Phi(\lambda)=\cos^{-1}[d\sin\theta_\lambda/\lambda]$$

where $\Phi$ is the phase delay caused by the Bragg reflector, $\theta$ is the steering angle, $\lambda$ is the wavelength of the light being steered, and d is the separation between the waveguides. Thus, according to the fabrication method of the present invention, one of ordinary skill in the art can fabricate a device for a particular application.

For example, the fabrication process described herein can be utilized to fabricate a waveguide device, such as device 10 in FIG. 1. Operation of such a device is as follows. A light signal having wavelengths $\lambda$M-1 enters exterior port 20M and is coupled into interior ports 400,402,404,406, and 40N. If element 50 is tuned to $\lambda$1, light having the wavelength $\lambda$1 is directed to exterior port 200, due to constructive interference. Due to destructive interference, light of wavelengths $\lambda$2-M does not appear at port 200. In a like manner, other wavelengths are directed to other ports by different wavelength selecting elements. Thus, precision alignment of the wavelength selecting elements is important for efficient operation.

According to a second embodiment of the present invention, a grating or gratings is written into the waveguide or waveguides by the photosensitivity effect. This fabrication process is explained herein with reference to FIGS. 4A and 4B.

Figure 4A:
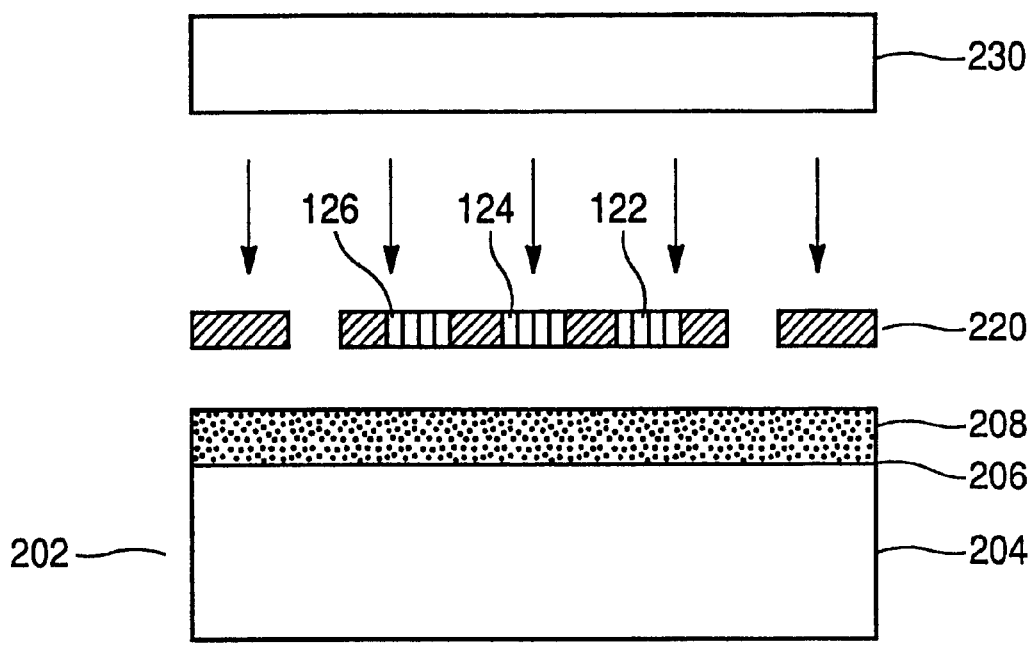
FIGS. 4A–4B show a schematic illustration of method of fabricating a grating in a planar waveguide device according to another embodiment of the present invention.

First, a substrate material is prepared, such as substrate material 202 shown in FIG. 4A. The substrate material includes a substrate 204 and a core layer 208. In this preferred embodiment, the substrate material 202 further includes a buffer layer 206, but it can be omitted.

Substrate layer 204 can be any conventional substrate used in waveguide applications, such as a silica-based material, such as Si, $SiO_2$, doped-$SiO_2$, SiON, and the like, or TaO. Other conventional substrates will become apparent given the present description. The substrate can be of various geometrical shapes, such as rectangular or circular. Preferably, the substrate is a $SiO_2$ substrate of circular shape, having a 100 millimeter (mm) diameter, and a thickness of between 0.5–2 mm.

In addition, for some materials such as silicon, the substrate can also include a buffer layer 206 located at or near the interface with the core layer 208. Preferably, the buffer layer 206 is of sufficient index of refraction to create an index differential of at or between about 0.3% to about 1.0% with respect to the index of refraction of the core layer, where buffer index <core index. For example, a preferred index differential is about 0.7%.

Substrate material 202 further includes a core layer 208, which can be selected from materials such as, but without limitation, doped-silica based materials and other conventional materials used for waveguides. For example, in a preferred embodiment, layer 208 is a doped-$SiO_2$ layer, having an index of refraction of about 1.46, and a thickness of about 1–10 micrometers ($\mu$m). In a preferred embodiment, core layer 208 has a slightly higher index of refraction than substrate layer 204 (or buffer layer 206, if utilized). Core layer 208 can be deposited on substrate 204 by conventional deposition techniques.

Substrate material 202 further includes a photoresist layer (not shown), which can comprise a conventional polymer or photoresist.

After the substrate material is prepared, a first photo-mask (not shown) that includes only a set of alignment marks undergoes a photolithogaphic exposure onto the thin photoresist layer. After development, the alignment marks are then shallow-etched into the core layer 208. By shallow-etch it is meant an etching of the alignment marks into the core layer at an etch depth of about 0.1–1.0 $\mu$m, preferably 0.5 $\mu$m, depending on the thickness of core layer 208. The shallow etch is less time consuming and helps to minimize the risk of damage to the core layer and still provides a surface relief structure for alignment procedures later on in the fabrication process. Alternatively, the alignment marks can be positioned in areas of the core layer that will not be defined as waveguide channels, thus the etch depth need not be critical.

According to the process of the second embodiment of the present invention, a grating or gratings is then defined directly into the core layer of the substrate material by photo-inscription, which is based on the photo-sensitivity effects in the core layer. In a preferred embodiment, multiple gratings are exposed on the substrate material. The grating definition is performed either holographically or with a photo-mask.

In a preferred aspect of this embodiment of the present invention, a second photo-mask 220 is exposed onto the substrate material using a light source 230, such as an ultraviolet laser. For example, the substrate material is disposed directly behind the photo-mask with respect to the location of the light source 230. During exposure, the light reaching the substrate material changes the index of refraction of the core layer (which, according to a preferred aspect, is doped with a photo-sensitive dopant, such as germanium) in a periodic manner (dependent upon the grating pattern of the photomask). The photo-inscribed grating is thus created through the entire volume of the photo-sensitive layer.

The photo-mask can be different from or similar to photo-mask 120 from FIG. 2C. The photo-mask 220 is preferably designed based on the wavelength of the light source being used because the photosensitivity effect is wavelength dependent. In addition, the choice of output wavelength for the light source 230 depends on the material used for the core layer. Preferably, photo-mask 220 contains one or more grating patterns 122, 124, and 126 and alignment marks and can be fabricated according to the mask fabrication techniques discussed above. In addition, a narrow-line width laser having an output wavelength in the UV-blue region of the electromagnetic spectrum, such as an argon ion laser, is preferably used as the light source.

In an alternative aspect of this embodiment of the present invention, a holographic technique is used to create an exposure of a grating onto the substrate material with an interfering beam apparatus. Suitable interfering beam techniques are known.

Next, a waveguide channel or multiple waveguide channels are defined in core layer 208. In a preferred aspect of this embodiment of the present invention, after the grating or gratings are written into the core layer, the substrate material is covered with a second photoresist layer (not shown). Then, an exposure of the waveguide pattern is performed using a third photo-mask. The waveguide pattern contains a plurality of lines or stripes corresponding to a plurality of waveguide channels to be formed in the core layer. In addition, the photo-mask contains a plurality of alignment marks to ensure proper alignment with the substrate material.

Figure 4B:
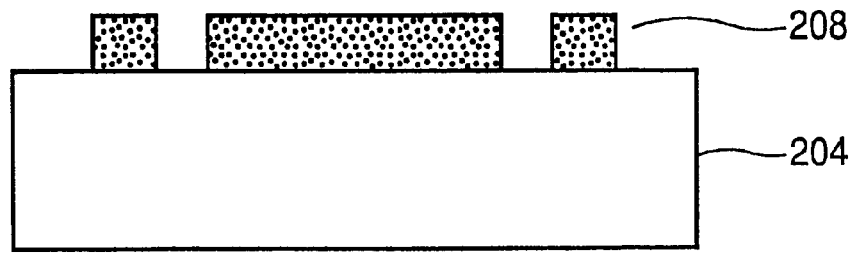

Next, an etching is performed of the core layer 208 to define a waveguide or multiple waveguides in the first core layer. The etching can be performed by using a conventional etching technique, such as RIE or ion beam etching. Thus, the remaining structure, such as shown in FIG. 4B, after the etch is the waveguide channel or channels disposed on the substrate 204, each containing the grating or gratings formed in the photoinscription step. In a preferred aspect, the photoinscribed gratings are each oriented with a predetermined angular position with respect to each waveguide channel. A device having a waveguide pattern similar to optical waveguide device 150 from FIG. 3A can be fabricated.

After the waveguides are defined by the etching, an overcladding layer (not shown) is deposited on the remaining structure. The deposition can be performed using the conventional techniques discussed above. In a preferred aspect of this embodiment, the overcladding layer comprises the same material as the substrate layer 204, in this example, undoped-SiO$_2$ material.

While the invention has been described in detail and with reference to specific embodiments thereof, it will be apparent to one skilled in the art that various changes and modifications can be made therein without departing from the scope of the invention. Thus, the breadth and scope of the present invention should not be limited by any of the above-described exemplary embodiments.

What is claimed is:

1. A method of fabricating a surface grating in a planar waveguide device, comprising:
   providing a substrate material that comprises
      a substrate layer,
      a first core layer,
      a second core layer, and
      a first photoresist layer;
   generating a first exposure of a grating and a plurality of alignment marks onto the substrate material;
   first etching the second core layer to form the grating in the second core layer;
   depositing a second photoresist layer on the substrate material that remains after said first etching;
   generating a second exposure of a waveguide pattern in the first core layer; and
   second etching the first core layer to define a first waveguide in the first core layer, said first waveguide having a first portion with the surface grating.

2. The method according to claim 1, further comprising:
   depositing an overcladding layer on the first core layer remaining after the first core layer is etched.

3. The method according to claim 1, wherein the substrate material further comprises:
   a first cladding layer disposed between the first and second core layers.

4. The method according to claim 3, wherein the grating is a Bragg reflector surface grating having a mode coupling coefficient-length product value of about 4.15, wherein an index of refraction of the first core layer is 1.46.

5. The method according to claim 1, wherein the generation of the first exposure includes:
   disposing a photo-mask between the first photoresist layer of the substrate material and a light source, the photo-mask including a grating pattern and an alignment mark pattern; and
   irradiating the photo mask with the light source.

6. The method according to claim 5, wherein the photo-mask includes a plurality of grating patterns and a plurality of alignment mark patterns, wherein the etching of the second core layer forms a plurality of gratings and alignment marks in the second core layer, wherein the generation of the second exposure of a waveguide pattern containing a plurality of stripes corresponding to a plurality of waveguides is made in the first core layer, and wherein the etching of the first core layer defines a plurality of waveguides in the first core layer, the plurality of waveguides each having a first portion with surface gratings for each waveguide.

7. The method according to claim 6, wherein the planar waveguide device is monolithic, wherein the surface gratings are etched on the substrate material over parallel paths of a phasar region of the planar waveguide device, wherein the surface gratings have the same length, and wherein each of the surface gratings varies in angle with respect to a longitudinal axis of the planar waveguide device.

8. The method according to claim 1, wherein the generation of a first exposure includes:
   performing a holographic technique with an interfering beam apparatus to form an exposure of a grating on the first photoresist layer.

9. The method according to claim 1, wherein a thickness of the substrate layer is from about 0.5 millimeters to about 2 millimeters, a thickness of the first core layer is about 1 micrometer to about 10 micrometers, and a thickness of the second core layer is about 0.1 micrometers to about 2 micrometers.

10. The method according to claim 1, wherein the first and second core layers are selected from the group consisting of Si, SiO$_2$, doped-SiO$_2$, TaO, and SiON.

11. A method of fabricating a grating in a planar waveguide device, comprising:
   providing a substrate material that includes
      a substrate layer,
      a core layer, and
      a first photoresist layer;
   disposing a first photo-mask between the first photoresist and a light source, the photo-mask including a plurality of alignment marks;
   irradiating the first photo-mask with the light source;
   performing an etch of the alignment marks into the core layer;

generating a first exposure of a grating in the core layer by a photosensitive effect;

covering the etched substrate material with a second photoresist layer;

generating a second exposure of a waveguide; and etching the core layer to define a first waveguide, said first waveguide having a first portion containing the grating.

12. The method according to claim 11, further comprising:

generating the second exposure of a waveguide pattern in the core layer, wherein the waveguide pattern contains a plurality of stripes corresponding to a plurality of waveguides, wherein the etching of the core layer defines the plurality of waveguides in the core layer, said plurality of waveguides each having a portion containing the grating.

13. The method according to claim 11, wherein said first exposure further composes:

disposing a second photo-mask between the core layer and a light source, the second photo-mask including a grating pattern and an alignment mark pattern; and irradiating the second photo-mask with the light source.

14. The method according to claim 11, wherein said forming an exposure of a grating comprises:

performing a holographic technique with an interfering beam apparatus to form an exposure of the grating on the first core layer.

15. The method according to claim 11, wherein a thickness of the substrate layer is from about 0.5 millimeters to about 2 millimeters and a thickness of the core layer is about 1 micrometer to about 10 micrometers.

16. The method according to claim 11, wherein the core layer is selected from the group consisting of Si, $SiO_2$, doped-$SiO_2$, TaO, and SiON.

* * * * *